United States Patent [19]

Johansson et al.

[11] Patent Number: 5,078,961
[45] Date of Patent: Jan. 7, 1992

[54] SELF LOCATING SPRINGS FOR FERRULE SPACER

[75] Inventors: Eric B. Johansson, San Jose, Calif.; Harold B. King, Wrightsville Beach, N.C.

[73] Assignee: General Electric Company, San Jose, Calif.

[21] Appl. No.: 623,828

[22] Filed: Dec. 6, 1990

[51] Int. Cl.⁵ .................................. G21C 3/32
[52] U.S. Cl. ..................... 376/448; 376/441; 376/439; 376/443; 376/434
[58] Field of Search ............ 376/441, 439, 443, 448, 376/434

[56] References Cited

U.S. PATENT DOCUMENTS

| | | | |
|---|---|---|---|
| 4,411,862 | 10/1983 | Leclercq et al. | 376/442 |
| 4,544,522 | 10/1985 | Curulla et al. | 376/441 |
| 5,002,726 | 3/1991 | Johansson | 376/448 |

Primary Examiner—Brooks H. Hunt
Assistant Examiner—Meena Chelliah
Attorney, Agent, or Firm—R. R. Schroeder

[57] ABSTRACT

A spacer with a spring construction for the fuel bundle having matrix of parallel side by side fuel rods supported within a fuel channel between a supporting lower tie plate and holding upper tie plate is illustrated. The spacers each have a corresponding matrix of individual ferrules each surrounding the discrete fuel rods to be spaced within the matrix of fuel rods at any given elevation within the fuel bundle. Each of the individual ferrules surrounding the individual fuel rods are provided with stops against which the fuel rods are biased to ensure the required side-by-side spacing. Each ferrules must have at least one spring for forcing the fuel rods against the stops of its spacer ferrules to enable the spacer to assure required side-by-side alignment of the fuel rod. The springs are provided with a continuously looping main body having protruding tabs on opposite sides of the springs. The paired ferrules are confronted at their main body and provide a defined space between the confronted apertures on either side of the apertures for permitting protrusion of spring tabs for holding the spring within the confronted apertures. The springs are placed between the two ferrules so as to be trapped by and confined within the respective confronted apertures of the interstitial space between the confronted ferrules. The springs as trapped within the apertures at their main body and confined within the apertures by the tabs become self centering to the ferrule pair. The relative movement between the legs of the spring is permitted enabling the design of the dense fuel rod arrays requiring greater relative spring movement for fuel assembly.

19 Claims, 8 Drawing Sheets

SELF LOCATING SPRINGS FOR FERRULE SPACER

BACKGROUND OF THE INVENTION

This invention relates to spacers for use in nuclear fuel bundles for maintaining individual fuel rods or tubes containing fissionable materials in their designed spaced apart relation. More particularly, a spacer is disclosed which has both an improved spring for biasing fuel rods to their correct designed location as well as an improved self-centering spring mounting to the spacer.

SUMMARY OF THE PRIOR ART

Modern boiling water nuclear reactors typically include a core composed of many discrete fuel bundles. Water circulates from the bottom of the each fuel bundle of the core, is heated in passing upward through each fuel bundle, and passes out the top of each fuel bundle in the form of heated water and steam.

The fuel bundles are composed of discrete groups of fuel rods—sealed tubes which contain nuclear fuel. Typically, the fuel rods are supported upon a lower tie plate and held in side-by-side vertical relation by an upper tie plate. Water flow is confined within a fuel bundle channel extending from the lower tie plate to the upper tie plate. In addition to supporting the fuel rods, the lower tie plate admits water into the interior of the fuel bundle. The upper tie plate—in addition to maintaining the fuel rods upright—permits the heated water and generated steam to exit the fuel bundle.

The fuel bundles are elongate—typically being in the range of 160 inches in length. Consequently, the individual fuel rods within the fuel bundles are flexible along the length of the fuel bundle. If unsupported, the individual fuel rods could easily wander out of their intended side-by-side spacing.

Preservation of the intended side-by-side spacing of fuel rods within a fuel bundle is important. Specifically, if the fuel rods are not maintained within their desired side-by-side spacing, the required designed nuclear reaction and concurrent heat generation with steam production does not efficiently occur.

Further, vibration of the fuel rods is undesirable; fuel rods become heated pressure vessels during nuclear reaction. Maintaining these heated pressure vessels sealed is vital to reactor operation.

To maintain the required spacing between the individual fuel rods and to prevent unwanted vibration, it has long been the practice of the nuclear industry to incorporate spacers along the length of the fuel bundles. Typically, anywhere from five to ten spacers—usually seven—are placed within the each fuel bundle. The spacers are preferably placed at varying elevations along the length of the fuel bundle to brace the contained fuel rods in their designed location.

Spacer construction is easily understood. Each spacer has the task of maintaining the precise designed spacing of the particular matrix of fuel rods present at its particular elevation within a fuel bundle. Consequently, it has been a common practice to provide each spacer with a matrix of ferrules for surrounding each fuel rod of the corresponding matrix of fuel rods. Each ferrule is provided with at least one stop. The fuel rods when biased into the stop(s) of their ferrules have their precise designed side-by-side spacing preserved.

The necessary biasing of the fuel rods within the spacers has been accomplished by individual springs. In the prior art it has been a common practice to have two side-by-side ferrules share the same spring at a common aperture defined between the ferrules. Typically the shared spring is of the loop configuration having two spring legs joined together at the top and at the bottom to form a continuous and elongated loop spring One spring leg protrudes through the common aperture into a first ferrule of a ferrule pair and biases the fuel rod in the ferrule against the stops of the first ferrule of the ferrule pair. The other spring leg protrudes through the common aperture into the other ferrule of the ferrule pair and biases the other fuel rod in the second ferrule against the stops of the second ferrule of the ferrule pair.

Maintaining the loop springs of the prior art within the side-by-side ferrule pairs has been difficult. The common aperture between adjacent ferrules has been defined by configuring an aperture in each ferrule and confronting the ferrules at these defined apertures. The confronted apertures define the common aperture. These confronted apertures have been configured with irregular shapes having protruding internal surfaces—for example apertures of the "E" variety have been used. By the expedient of either overlapping or confronting protruding portions of the confronted apertures between the loops of the prior art springs, capturing of the springs into the common aperture between the spacers has resulted. With the loop springs confined into the common aperture between the metal walls of a ferrule pair, it has been possible to effect the required spring biasing in two ferrules with a single confined loop spring.

Unfortunately, modern fuel bundle design has complicated the design of spacer springs and spacers. Fuel bundles have become more densely packed with smaller diameter fuel rods. As a consequence, the space available for both spring movement and capturing of the spring to the spacer has become vastly reduced.

As fuel bundles have become more dense, the number of springs required across a spacer has increased. Unfortunately, the required movement of the springs in either maintaining the fuel rods in alignment or permitting assembly of the fuel bundle in the first instance has remained unchanged. The practical effect of having denser fuel bundles has resulted in the need for redesign of the springs within fuel bundle spacers.

Further, assembly of fuel bundles has further complicated this problem. Specifically, the biasing springs of individual spacers have a tendency to scratch fuel rods when fuel rods are inserted to the spacers. These scratches can possibly be the location for the commencement of corrosion of the fuel rods during their in service life. This being the case, it is desirable to encase fuel rods in protective plastic sheaths during their insertion into spacers. Once insertion is complete, the plastic sheaths are removed.

The use of the plastic sheaths prevents scratches. Unfortunately, the use of plastic sheaths requires additional spring flexure during fuel bundle assembly. This additional flexure is necessary to permit the plastic protective coating to be temporarily inserted with the fuel rods into the fuel bundle. In some fuel bundles requiring initial insertion of the fuel rods with plastic coatings, it has not been possible to have existing spring flexure within design tolerances where two plastic covered fuel rods are placed simultaneously within the ferrules of a ferrule pair.

As a consequence, construction of some fuel bundles has required a complex procedure for inserting the fuel rod. Considering a ferrule pair and spring, a first fuel rod with a plastic sheath is inserted into one ferrule of the pair, and the sheath is removed. Then a second fuel rod with a plastic sheath is inserted into the remaining ferrule and its sheath is removed. This procedure is required because the prior art springs cannot deflect far enough to accommodate both fuel rods and both plastic sheaths. When it is realized that this alternating insertion procedure must be followed over a 9 by 9, 10 by 10, 11 by 11 or 12 by 12 matrix in a carefully controlled sequence, it can be understood that a spring design which permits simultaneous insertion of rod pairs, each with a plastic sheath, is desirable.

Finally, those familiar with mechanical design and mechanical design tolerances will realize that exact dimensions and perfect alignment are never as a practical measure achieved. Instead, a tolerance range is specified. The cost of manufacture increases as the tolerance range is narrowed. In the prior art spacers, and to a greater degree in new designs, a very tight tolerance range is required for the springs and ferrules. If a spring can be designed with greater flexibility, and a mounting method which allows more spring deflection, the tolerances can be less restrictive.

Because of at least the above design considerations, the providing of springs in spacers having improved flexibility has become a high priority.

A standard method for providing increased flexibility is to vary the width of the spring, using a lesser width in regions of low stress. Unfortunately, the width of the current loop spring is not easily varied. The loop spring starts out as a continuous circular loop of constant width and is then bent into its final shape. The circular loop, or the final spring could be machined to a varying width, but the cost would be high.

SUMMARY OF THE INVENTION

In a fuel bundle having a matrix of parallel side-by-side fuel rods supported within a fuel channel between a supporting lower tie plate and a holding upper tie plate, a new spring construction is illustrated for the required spacers for maintaining the fuel rods in their required precise side-by-side alignment for efficient nuclear reaction. Spacers are placed at preselected and typically regular intervals along the elevation of the elongate fuel bundle to prevent the otherwise flexible discrete fuel rods from moving out of their required precise side-by-side relation. The spacers each have a corresponding matrix of individual ferrules each surrounding the discrete fuel rods to be spaced within the matrix of fuel rods at any given elevation within the fuel bundle. Each of the individual ferrules surrounding the individual fuel rods is provided with stops against which the fuel rods are biased to ensure the required side-by-side spacing. Consequently, each ferrule must have at least one spring for forcing the fuel rods against the stops of its spacer ferrule to enable the spacer to assure required side-by-side alignment of the fuel rods. In the present disclosure, the prior art practice of having two side-by-side ferrules share the same biasing spring for two adjacent fuel rods is followed. Consequently, paired ferrules are each provided with apertures for capturing a single spring between the ferrules. The springs are provided with a continuously looping main body having protruding tabs on opposite sides of the springs. The paired ferrules are confronted at their respective apertures for the capture of the springs at their main body and to provide a defined space between the confronted apertures on either side of the apertures for permitting protrusion of spring tabs for holding the springs within the confronted apertures. Before the ferrules are confronted, the springs are placed so as to be trapped by and be confined within the respective confronted apertures of the ferrules. When confrontation of the ferrules has occurred, the springs at their protruding tabs extend into a small interstitial space defined by the apertures between the confronted ferrules. The springs as trapped between the apertures at their main body and confined within the apertures by the tabs become self centering to the ferrule pair and do not have the metal of the ferrules invading the interstitial space between the springs. As a result, greater relative movement between the legs of the springs is permitted enabling the design of this invention to be utilized in modern dense fuel rod arrays requiring greater relative spring movement both for assembly and operation under normal production tolerances. Three exemplary types of springs are illustrated. A first spring has a simple looping main body with two simple intermediate protruding tab pairs on either side of the main body, one tab pair at the top of the entrapping aperture and the remaining tab pair at the bottom of the entrapping aperture for holding the spring to the entrapping aperture. A second spring is disclosed in which the tab portions are located near the ends of the spring, midway between the two sides of the spring. This spring consists of two identical halves which are welded together. A third spring is disclosed in which the tab portions are included at either end of the spring and are used for entrapping the springs within their respective ferrule apertures, and are incorporated into the spring legs to produce a spring having longer spring legs with a resulting lesser range of spring force over the designed range of spring deflection. The manufacture of all three springs begins with flat strip material. A punching operation provides the variation in width required for optimum spring design and provides the locating tabs.

OTHER OBJECTS, FEATURES AND ADVANTAGES

An object of this invention is to mount a loop type spring between a ferrule pair of a spacer without having the material of the ferrules intrude within the loop of the spring. According to this aspect of the invention, paired ferrules are provided with confronting apertures. These apertures when confronted provide two functions. First, they trap between the ferrules the main body of the loop type spring. Second, they provide confining slots defined between the respective ferrule pairs. To mate with these confining slots, tabs protrude from the main body of the loop springs on either side of the loop springs. The tabs extend from the trapped main body of the loop spring within the confronted apertures into the confining slots. As a result, the loop springs are held to the confronted apertures of the ferrule pair by the tabs.

An advantage of the disclosed spring is that it is self centering with respect to the ferrule pair. Under the forces of compression exerted on the fuel rods, the spring seeks and maintains its designed position with respect to the ferrule pair.

An additional advantage of the disclosed spring design is that the material of the ferrules is no longer required to penetrate in between the discrete legs of the loop springs. This being the case, the spring legs are permitted a relatively greater movement—this compression permitting movement of each leg toward the remaining leg until contact of one spring leg with its opposed spring leg occurs. No longer is spring leg movement limited by the structure of portions of the ferrules invading the interstitial space between the discrete spring legs of the loop spring.

A further advantage of the disclosed spring and ferrule construction is that assembly of the spacers is simplified. Specifically, in the past the loop springs have had to be individually threaded to portions of the ferrules— and thereafter trapped in place by manipulation of the confronting ferrules. With the design here disclosed, simple trapping of the spring between confronted ferrules is all that is required.

An additional advantage of the greater flexibility of the spring construction here disclosed is that the insertion of fuel rods covered with protective plastic sheaths is possible simultaneously on both sides of confronted ferrules. It is not required to insert the plastic sheath covered fuel rods on an alternating basis to avoid over stressing of the springs.

An additional object of this invention is to utilize the projecting tabs required for locating the spring as additional portions of the spring. According to this aspect of the invention, a loop spring is disclosed which has upper and lower protruding tabs which form portions of the body of the loop spring. These respective portions of the loop spring give the main spring body a longer effective length. As a result, spring compression can occur with a more uniform compression acting. A "softer" spring results.

An additional object of this invention is that the width of the spring can be varied over its span without an increase in cost, giving a more efficient spring design.

Another advantage of this invention is the additional flexibility of the spring enabling greater design tolerances in the spacer and spring. Accordingly, manufacturing costs can be saved.

Figure 1:
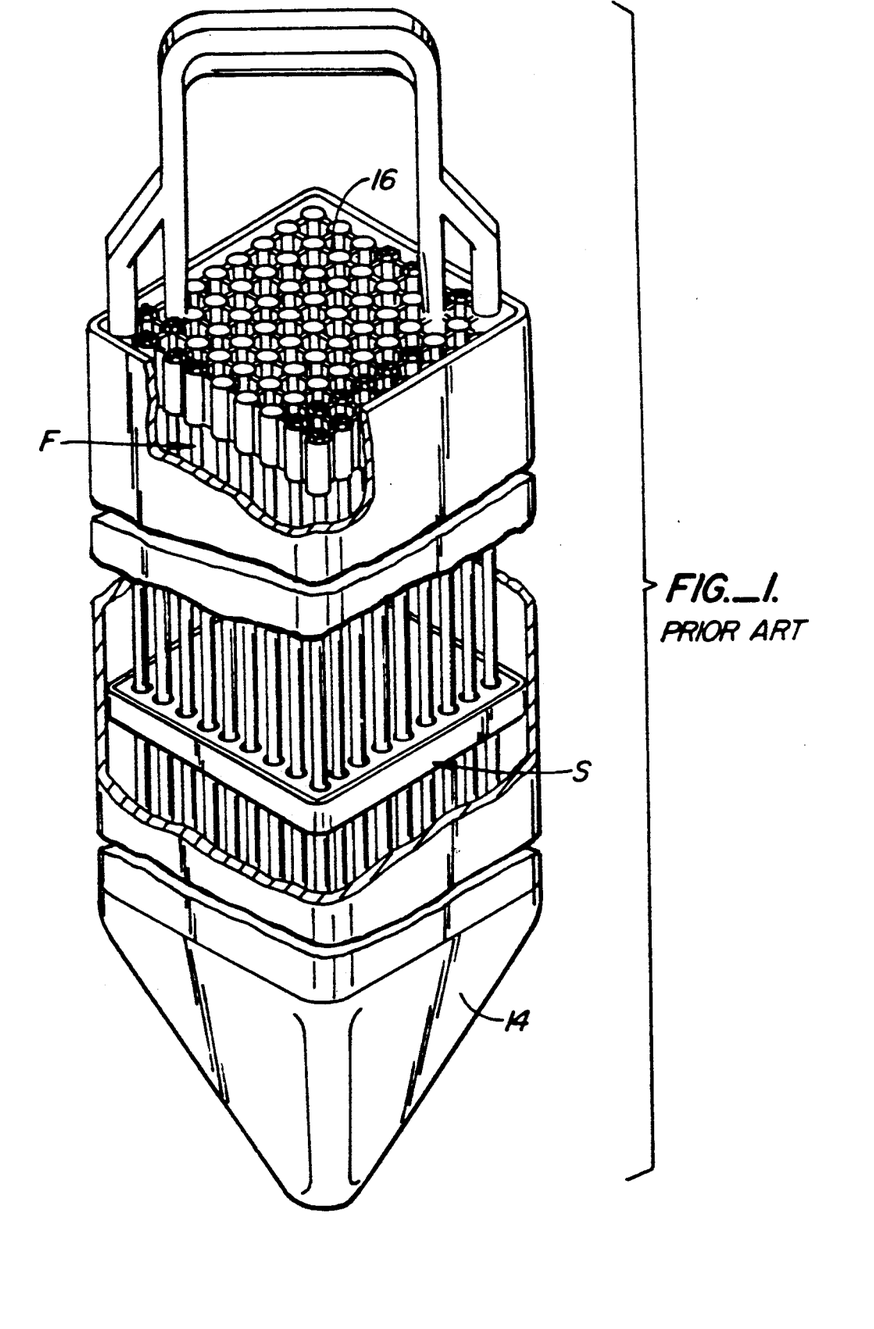
FIG. 1 is a perspective view of a broken away fuel bundle having contained side-by-side fuel rods illustrating a bottom tie plate for the support of fuel rods and the inflow of coolant, a top tie plate for maintaining individual fuel rods in side-by-side vertical upstanding relation and permitting the outflow of heated coolant, and a typical spacer positioned therebetween for maintaining the fuel rods in their designed spaced apart relation.

Referring to FIG. 1, a typical prior art fuel bundle is illustrated in perspective with the major sections between the top and bottom of the bundle removed. The fuel bundle has a lower tie plate 14, an upper tie plate 16, and a plurality of fuel rods F. Fuel rods F extend vertically the length of the fuel bundle from a position of support on lower tie plate 14 to the upper tie plate 16.

Unlike the illustration here shown, the fuel bundle is elongated. Typically, it is in the order of 160 inches long with approximately a 5"×5" cross-section. This being the case, it will be appreciated that the fuel rods within the bundle assembly are flexible in the longitudinal direction.

In the particular case here shown, a 9×9 array of fuel rods is illustrated. Arrays of 10×10, 11'11, and 12×12 are known. It goes without saying that as the arrays become more dense, fuel rod diameter decreases and longitudinal flexibility increases.

A word of explanation about the term fuel rods. Typically, fuel pellets are placed within tubular metallic cladding. The metallic cladding is thereafter sealed at both ends. So-called "fuel rods" F become sealed pressure vessels. It will be appreciated that each of these individual fuel rods F because of its 160" length is individually flexible.

It is well known that in the nuclear operation of the fuel bundle the spacing between discrete fuel rods F is important. Specifically, this spacing is important both for efficiency of the nuclear reaction as well as the generation of steam. Furthermore, any vibration on the fuel rods F is undesirable as such vibration can induce either rod abrading or cracking with resultant leakage of the contained radioactive materials interior of the fuel rods. To assure the proper spacing and a lack of vibration a plurality of spacers S are placed along the length of the fuel bundle F. Typically, 5 to 10 such spacers are utilized with 7 spacers being the ordinary number utilized. The spacers are placed at individual preselected elevations along the length of the fuel bundle.

Referring to the illustrated spacer S in the 9×9 array of FIG. 1 it will be seen that each spacer consists of a grid of ferrules. These ferrules are illustrated in ferrule pairs in the prior art illustrations of FIGS. 2A-2D and 3A-3D.

Figures 2A, 2C:
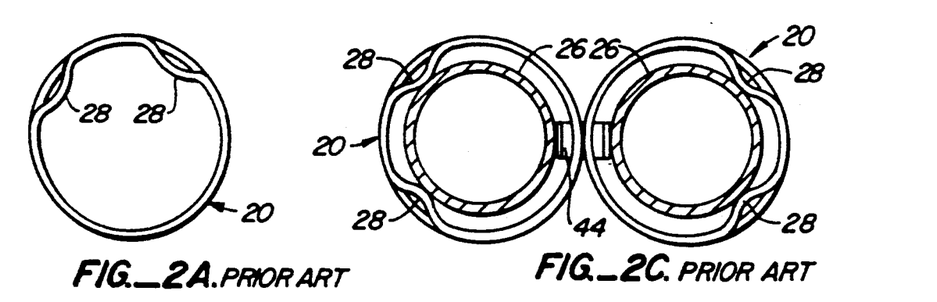
FIGS. 2A and 2B are respective plan and elevation views of a prior art ferrule having an irregular shaped aperture with protruding portions utilized in a prior art spacer.
FIGS. 2C and 2D are respective views of prior art paired ferrules such as that shown in FIGS. 2A and 2B, the ferrules here illustrated confronted one to another at irregular shaped apertures and trapping therebetween at protruding portions of the irregular apertures a loop spring, the loop spring here shown biasing two discrete fuel rods against stops of the ferrules for maintaining the fuel rods in their designed spaced apart relation.

Referring to FIG. 2A, a typical ferrule 20 is illustrated. The ferrule is bent at its upper and lower portions to form stops 28. As will be pointed out with respect to FIG. 2C, it is the function of the stops 28 to enable the individual fuel rods 26 to be biased against the stops to assume their desired side-by-side spacing.

Figure 2B:
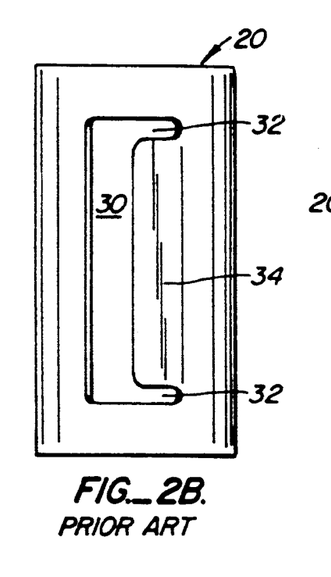

Referring to FIG. 2B, an aperture 30 is illustrated cut within the side of the ferrule. The aperture includes two indentations 32, which indentations 32 define a protruding ear 34. As will be seen with respect to FIG. 2D, when the respective ears 34 are overlapped one to another, they can entrap a loop spring.

Figure 2D:
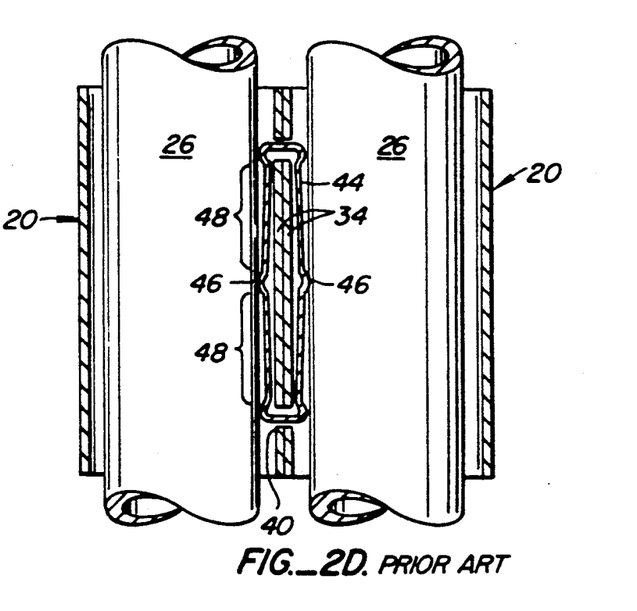

Referring to FIG. 2D, two ferrules are abutted. When they are abutted, they define a common aperture 40 which aperture 40 surrounds a loop spring 44. In the particular embodiment illustrated in FIG. 2D, the double protrusions 34 are opposed and form a double wall thickness interior of the loop spring 44. This double wall thickness holds the loop spring in place.

Referring to FIG. 2C, loop spring 44 is shared between the paired ferrules 20. The loop spring contacts the contained fuel rods 26, and biases rods 26. As biased the rods are pushed against their respective stops 28 within the ferrules 20. When the rods are pushed against the respective rods 28, they assume their designed side-by-side spacing.

As has been previously emphasized, when the rod arrays become dense, the space between the rods 26 is reduced and the movement of the legs of the spring 48 responsive to the compression of the rods is limited. Specifically the rod contacting portions 46 of the spring comes into contact with the walls 34 between the respective ferrules 20. Spring motion is limited.

A further problem exists. Specifically, when the fuel bundles are assembled, rod contacting portions 46 of the spring have been known to scratch the sides of the fuel rods 26. Such scratches can be points where corrosion commences. Accordingly, it is desirable to cover the respective rods 26 with a thin plastic layer before insertion. Upon insertion, the plastic layer is removed and the problem of the rod contacting portions 46 of the spring scratching the sides of the fuel rods 26 are avoided.

Unfortunately, space for spring movement has become so limited that it is not possible to insert two plastic covered fuel rods into a ferrule pair. It has become necessary to insert a first coated rod 26, and remove its cover before inserting a second coated rod 26 and removing its cover.

In an effort to provide more spring flexure, the prior art has tried to reduce the wall thickness between the respective springs.

Figure 3A:
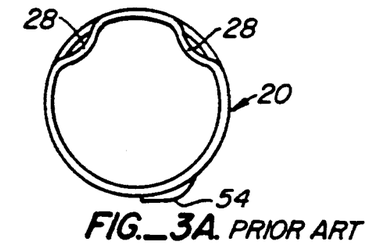
FIGS. 3A and 3B are respective plan and elevation views of an additional prior art ferrule having an irregular shaped aperture with a protruding portion of the aperture bent out of the plane of the ferrule material for use within a prior art spacer.

Referring to FIG. 3A, a ferrule with paired stops 28 is illustrated. Unlike the ferrule 20 of the FIG. 2A, ferrule 20 of FIG. 3A has a protruding ear member 54. Ear member 54 is bent out slightly from the wall of the ferrule.

Figure 3B:
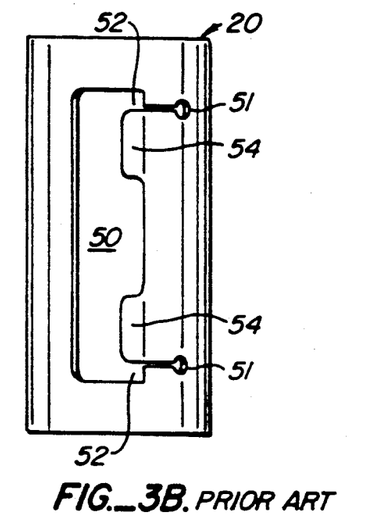

Referring to FIG. 3B, aperture 50 is illustrated. The aperture 50 includes two protruding tabs 54, which tabs 54 impart to the aperture an overall E-type configuration. For stress relief and to provide ease of bending, two apertures 51 are provided.

It will be seen in the view of FIG. 3A that tabs 54 are bent outwardly from the walls of the ferrule 20. As bent outwardly from the walls of the ferrule 20, they protrude outwardly approximately one-half of a wall thickness.

Figure 3C:
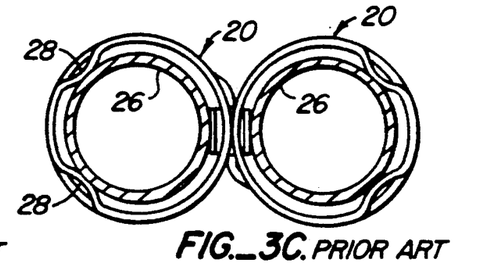
FIGS. 3C and 3D are respective plan and elevation views of the ferrule construction of FIGS. 3A and 3B, the ferrules here shown confronted one to another at their irregularly shaped apertures and trapping therebetween at the protruding portion of their apertures a leaf spring for biasing two fuel rods against respective stops.
Figure 3D:
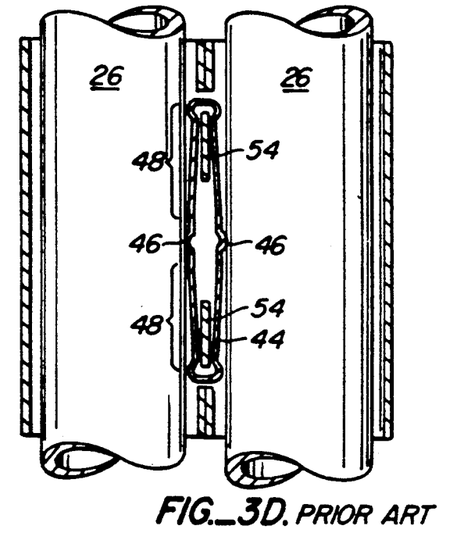

Referring to FIGS. 3C and 3D, the respective ferrules are confronted to one another. They are confronted with their tabs 54 opposed. The tabs as opposed come into abutment one with another.

When the tabs are in abutment they serve to trap the spring members 44 therebetween. The trapped spring members contact the respective fuel rods 26 and urge the fuel rods against the respective stops 28.

It can be seen with this prior art design additional flexure can be imparted to the legs 48 of the spring 44. Specifically with a single thickness of metal 54 in between the respective legs 48 of the spring, greater flexibility of the spring is present.

Nevertheless, it has been found that the ferrule mounting herein disclosed can and does cause restricted movement of the spring.

Additionally, and with respect to the prior art of FIGS. 3C and 3D, assembly can be complicated. The process of positioning spring 44 and threading the respective tabs 54 into abutment is only accomplished with some difficulty. Accordingly, it is a major feature of this invention to simplify the construction.

Figure 4A:
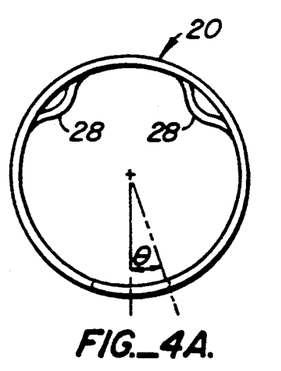
FIGS. 4A and 4B are respective plan and elevation views of the altered ferrule of this invention, this ferrule designed for confronting and entrapping the improved loop spring of this invention.
Figure 4B:
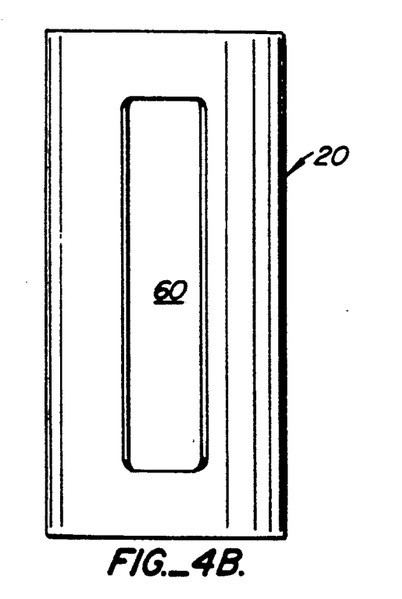

Referring to FIGS. 4A and 4B, a ferrule 20 for incorporation into the matrix of a spacer according to this invention is illustrated. Ferrule 20 includes a single aperture 60 which aperture 60 is rectangular and therefore regular in section.

Aperture 60 is typically as long as the loop spring. As will be hereinafter set forth, the loop spring fits interior of the aperture 60. At the same time, the width of aperture 60 is carefully selected. The width, defined in terms of degrees from the central axis of the ferrule 20, is approximately 35°. With such a dimension, two things can occur when two such ferrules 20 are confronted.

First, a spring can fit within the aperture 60. Secondly, and at the sides of the aperture, there are defined tab receiving slots. These slots are defined in the interstices between two confronted ferrules 20. By the expedient of providing a spring with tabs to fit within these slots, confinement of a spring can result.

Figure 5:
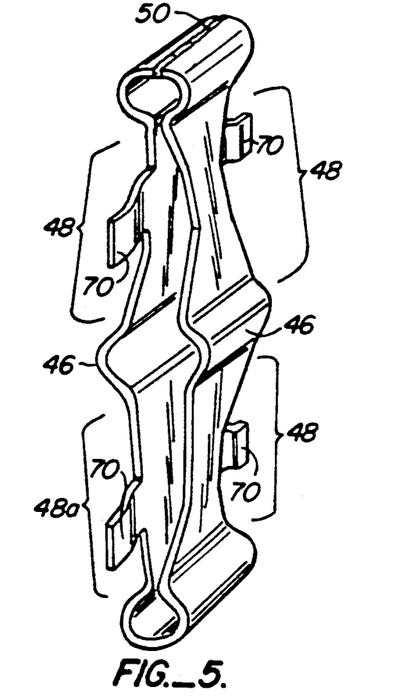
FIG. 5 is a perspective view of the improved loop spring of this invention.

Referring to FIG. 5, a spring for confrontation between the respective ferrules 20 of FIG. 4 is illustrated.

The spring, like the prior art, includes two rod confronting portions 46 with respective spring legs 48 therebetween. Typically, the spring is welded at one C-shaped end at a weld 50 and is continuously bent to a C-shaped configuration at the other end in a loop configuration.

Unlike the prior art, the spring includes four protruding tabs 70. Tabs 70 protrude on the respective opposite sides of spring legs 48A. Two tabs 70 protrude at the bottom of the spring, two tabs 70 protrude at the top of the spring. As will hereinafter be made more clear, these tabs locate the spring between two adjacent ferrules. The tabs project into regions between two confronted ferrules, and limit motion of the spring in the direction normal to the axes of the ferrules. Each spring is held in place at the common aperture defined between the opposed ferrules.

The width of the spring legs 48 varies over their length, being widest at the top and bottom of the spring and at the middle of the spring. The central part of each leg has a reduced width, as can be more clearly seen in FIG. 6b.

Figure 6A:
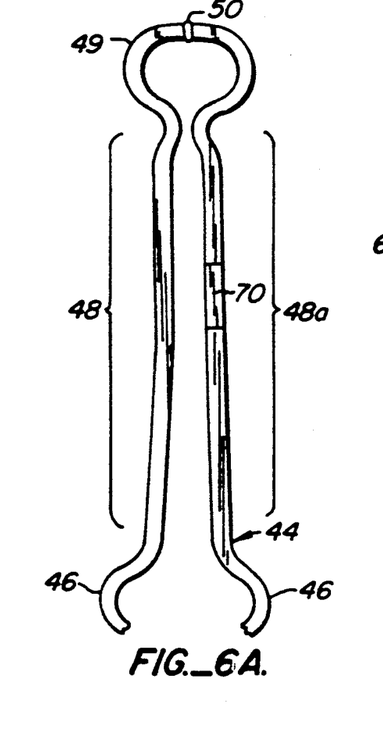
FIGS. 6A, 6B and 6C are respective detailed sections taken through the improved spring of FIG. 5 illustrating in detail the spring construction.

Referring to FIG. 6A, a section of the spring construction here illustrated is shown. Referring to FIG. 6A, it can be seen that half of a loop spring 44 is illustrated. The loop spring includes rod contacting portions 46 and respective legs 48, 48A. The respective legs 48, 48A are adjoined to a C-sectioned end 49 here shown welded with a weld 50.

It will be observed that the spring at the C-sectioned end 49 has an extremely narrow clearance between the sections of the C. Specifically, clearance here is so narrow (especially under states of compression), that mounting of the spring around metal sections as in the prior art of FIGS. 2A-2D and 3A-3D is not possible.

Figures 6B, 6C:
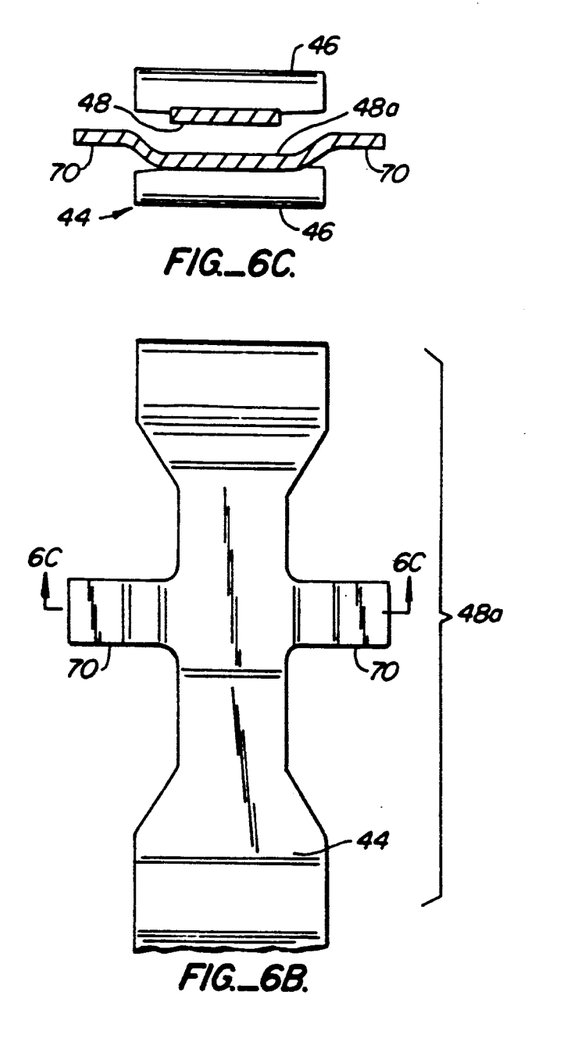

Referring to FIG. 6B, the respective tabs 70 can be seen. These respective tabs 70 protrude outwardly into and engage tab receiving slots at the respective upper and lower ends of the apertures. By such engagement, the spring is held within the common aperture between the respective ferrules 20, as will be set forth in more detail with respect to FIG. 7. FIG. 6B also shows the regions of reduced spring width 43.

Referring to FIG. 6C, it can be seen that the respective tabs 70 are bent out of the plane of the spring legs 48A. Such bending occurs so that the tabs 70 have the function of centering the spring.

Figure 7:
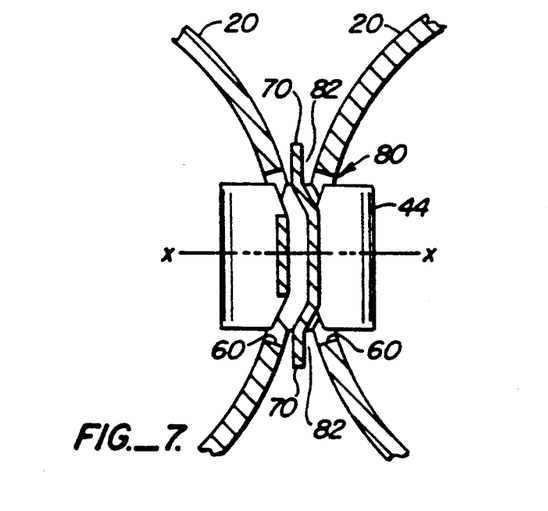
FIG. 7 illustrates the improved spring of FIG. 5 entrapped between paired ferrules of the construction of FIGS. 4A and 4B.

Referring to FIG. 7, the spring 44 is illustrated between the two ferrules 20. A cross section is shown at the elevation of the upper tabs. Each of the ferrules 20 has been confronted at its respective aperture 60. A discussion of the function of the confronted aperture 60 is instructive. When the ferrules 20 are confronted at their respective apertures 60, two classes of openings are defined between the respective ferrules 20. The first of these apertures is a common aperture 80. Common aperture 80 has a dimension slightly exceeding the height and width of the loop spring. Thus the loop spring is capable of being received within the common aperture 80 defined by the confronted apertures 60 of the confronted ferrules 20.

The apertures also serve to define tab receiving slots 82. Specifically, openings into the interstitial area between the respective ferrules are tab receiving slots 82. It is into these tab receiving slots 82 that the tabs 70 of the spring fit.

Assembly is easy to visualize. Specifically, ferrule pairs of ferrules 20 are confronted at their slots 60. They are confronted so as to define a common slot 80 and opposed tab receiving slots 82 along their respective sides.

The common rectangular aperture 80 restricts displacement of the spring in the direction perpendicular to the axis x—x, and in the direction perpendicular to the plane of the figure. The tabs 82 restrict displacement of the spring along the axis x—x. In this way, the spring is completely captured between a pair of ferrules.

Before the respective ferrule portions 20 are confronted, a spring is inserted between the respective ferrules. The spring 44 is captured within the common aperture 80. At the same time, the springs are held by the tab receiving slots 82.

Figure 8:
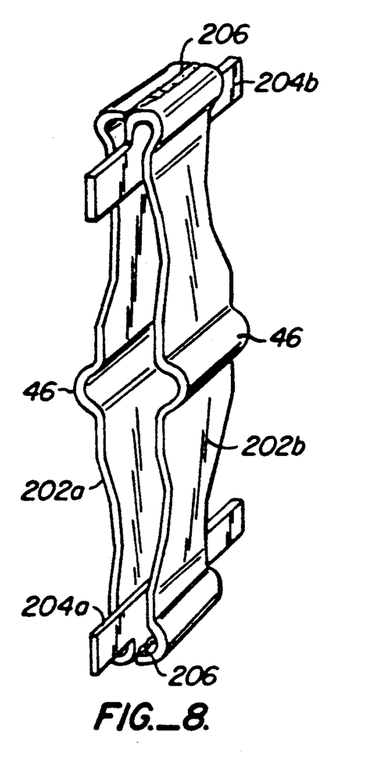
FIG. 8 is a perspective view of a second embodiment of the improved loop spring of this invention.

Referring to FIG. 8, a perspective view of a second embodiment of this invention is shown. In this embodiment, the spring is composed of two identical halves 202a and 202b, where the part on the right is inverted with respect to the part on the left. Locating tab 204a and 204b are located at the lower and upper ends of the spring halves 202a and 202b, respectively, and the springs are joined by welds 206 at top and bottom. Except for the locating tabs and the two-piece construction, this spring is similar to the first embodiment shown on FIG. 5. Rod contacting portions 46 urge the fuel rods against their respective stops.

Figures 9A, 9B:
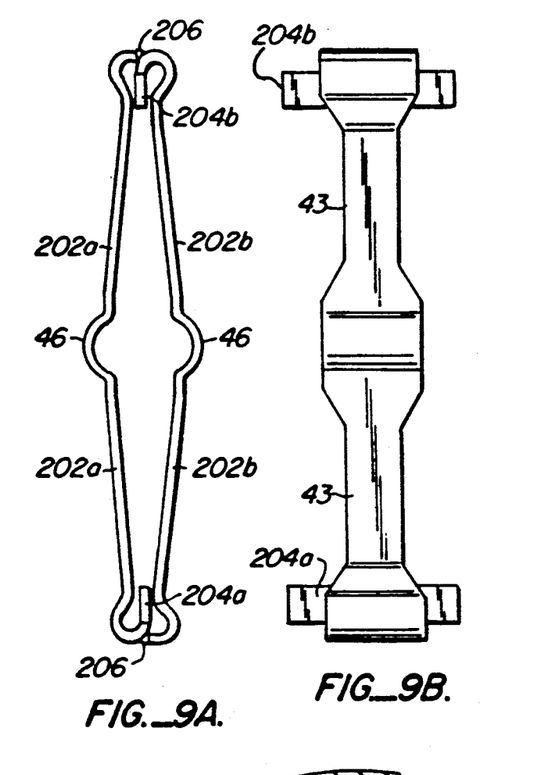
FIGS. 9A and 9B are respective detailed sections taken through the improved spring of FIG. 8 illustrating the construction in detail.

Referring to FIGS. 9A and 9B, an end view and a side view of the spring of FIG. 8 are shown. The locating tabs 204a and 204b are formed as extensions of the ends of the spring halves 202a and 202b, respectively. These tabs lie midway between the two sides of the spring. FIG. 9b shows the variation in width of the spring with the narrow portion 43.

Figure 10:
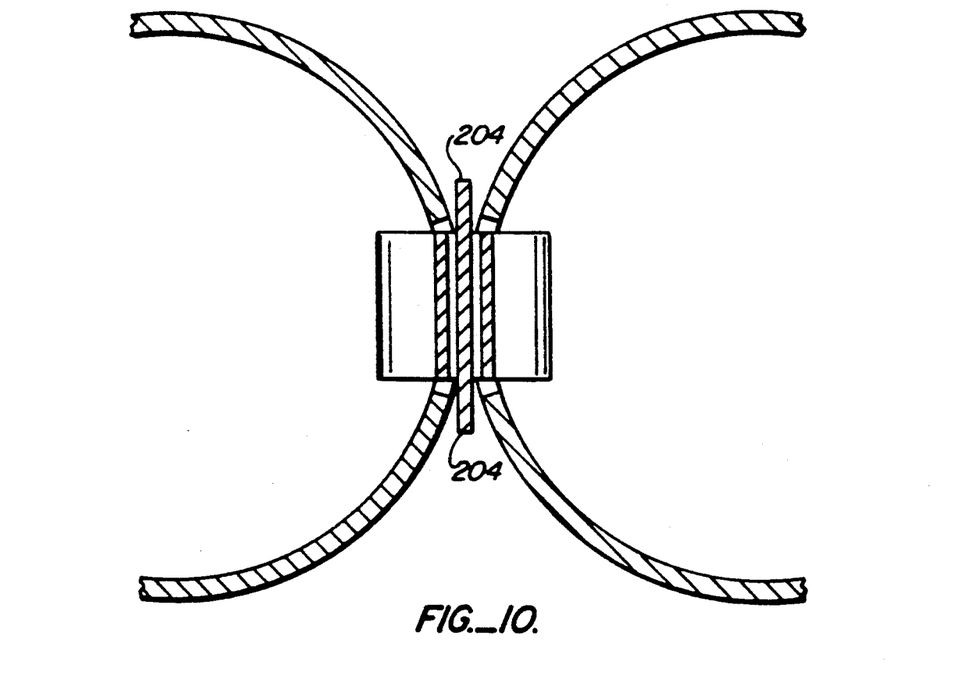
FIG. 10 illustrates the spring of FIG. 8 entrapped between paired ferrules of the construction of FIGS. 4A and 4B.

FIG. 10 shows the spring of FIG. 8 captured between two ferrules. A cross section through the upper locating tabs is shown. The locating method is the same as that of the first embodiment of the spring, shown in FIG. 6C.

Figure 11A:
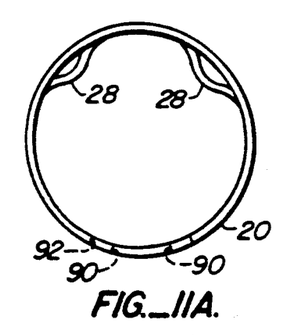
FIGS. 11A and 11B are respective plan and side elevations of an alternate ferrule construction with the ferrule here illustrating a "I" profile aperture.
Figure 11B:
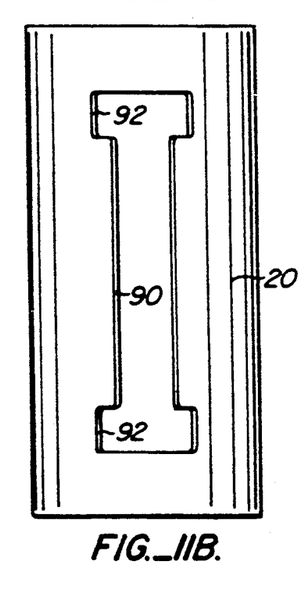

Referring to FIGS. 11A and 11B, an additional embodiment of this invention is illustrated. Specifically, a ferrule 20 has an "I" shaped aperture 90 configured therein. Aperture 90 includes upper and lower rectangular sections 92 which sections form the respective upper and lower bars of the "I" section of the aperture 90. As before, respective stops 28 form the points against which fuel rods are biased.

Figure 12:
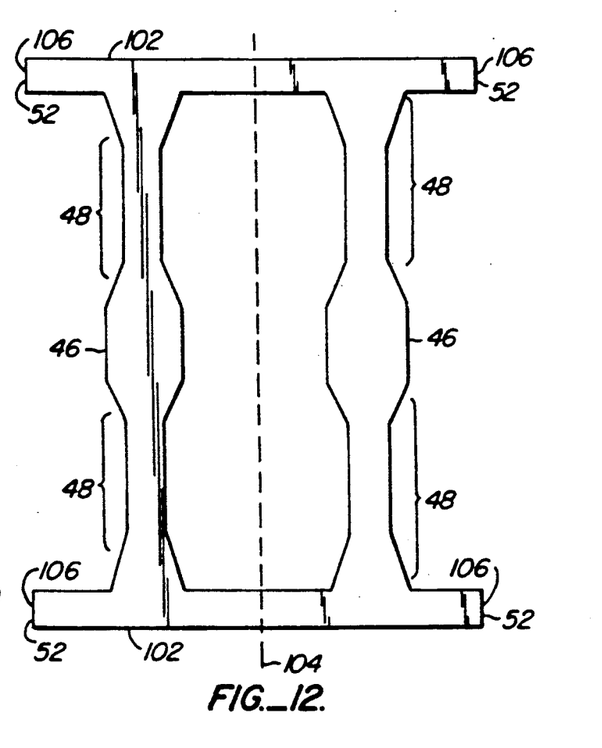
FIG. 12 is a plan view of spring material before formation into an alternate embodiment of the loop spring of this invention.

Fabrication of the spring can be easily understood. Specifically, spring metal, typically formed of Inconel, is stamped in the shape of the side elevation section view of FIG. 12. The view of FIG. 12 includes upper and lower bars 102 with spring legs 48 and rod contracting portions 46 formed therebetween. As will hereinafter be understood, this spring is bent about an axis 104.

Figure 13:
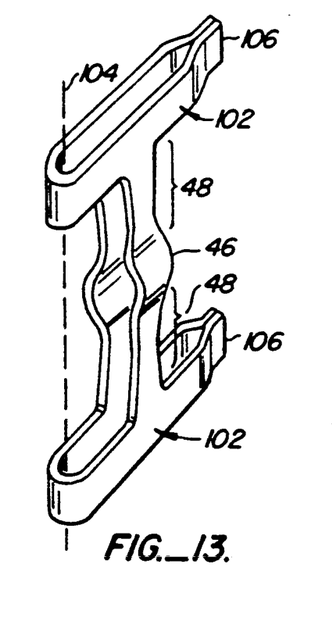
FIG. 13 is a perspective view of the loop spring of FIG. 12.

Referring to FIG. 13, the bent and configured spring can be easily understood.

Referring to FIG. 13, the respective portions of the spring have been bent about an axis 104, and the ends 106 are welded together. Such bending causes upper and lower bars 102 to bend in loop configuration back upon themselves. These members are integral with the spring legs 48 and expand the effective length of the spring. The rod contacting portions 46 act as before. Such a spring with an expanded effective length requires greater compression at the rod contacting portions 46 before appreciable change in the force required for the compression occurs. Such springs with an expanded effective length can be referred to as "softer" springs.

Figure 14:
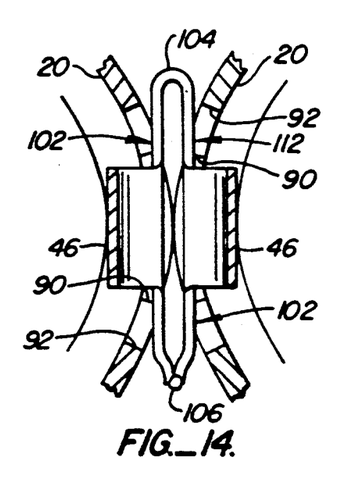
FIG. 14 is a cross section at the mid-height of the loop spring of FIG. 13 showing how the spring is located between two adjacent ferrules.

Trapping of the spring into the apertures 90, 92 is easily understood with respect to FIG. 14. Specifically, apertures 90—as before—capture the main spring body. Apertures 92—both above and below aperture 90 capture arms 102. Since arms 102 are a part of the spring, these arms are required to extend into the tab receiving slots 112 defined by confronted aperture portions 92 in each of the ferrules.

Construction is as illustrated before. The ferrules 20 are confronted with the spring of FIG. 13 trapped therebetween. When the ferrules are brought together—and fastened together—self-centering trapping of the spring occurs.

Figure 15A:
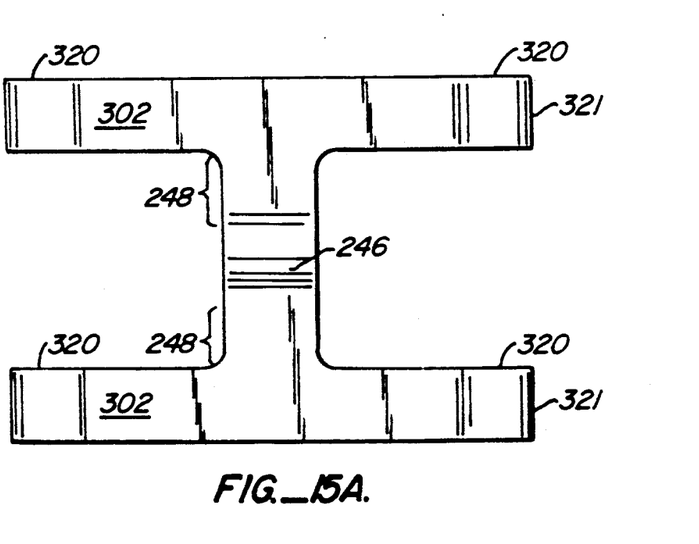
FIGS. 15A–15C are respective front elevation, top plan and side elevation of an alternate embodiment of the spring of this invention, this embodiment including C-shaped loops at the ends of the upper loop tab structure of the invention for keying the springs to confronted ferrules.
Figure 15B:
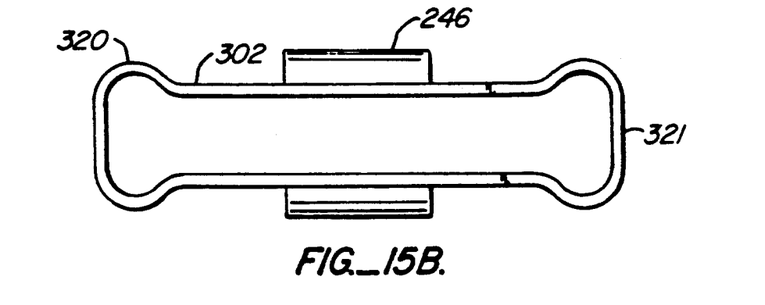
Figure 15C:
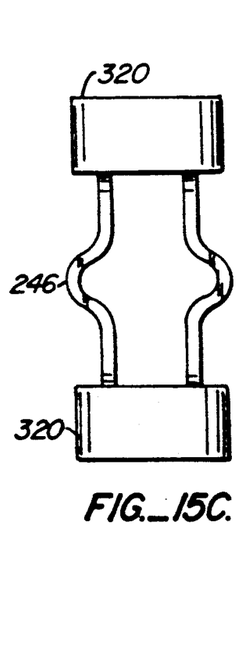

Referring to FIGS 15A–15C, an embodiment of the spring is disclosed in which the respective loop portions of the spring are integral with the tabs, and the tabs include C-shaped sections at their respective ends. These respective C-shaped ends at the tab loops are for retaining the springs to rectangular apertures in the side walls of the ferrules.

As can be seen, opposed rod contacting portions 246 extend outwardly on either side of the spring. These respective portions 246 connect at spring leg members 248 to upper and lower tab loops 302. The respective ends of the tab loops 302 contain the respective C-shaped loops 320. Two of these loops 320 are welded on one side to close the construction of the spring.

Figure 16:
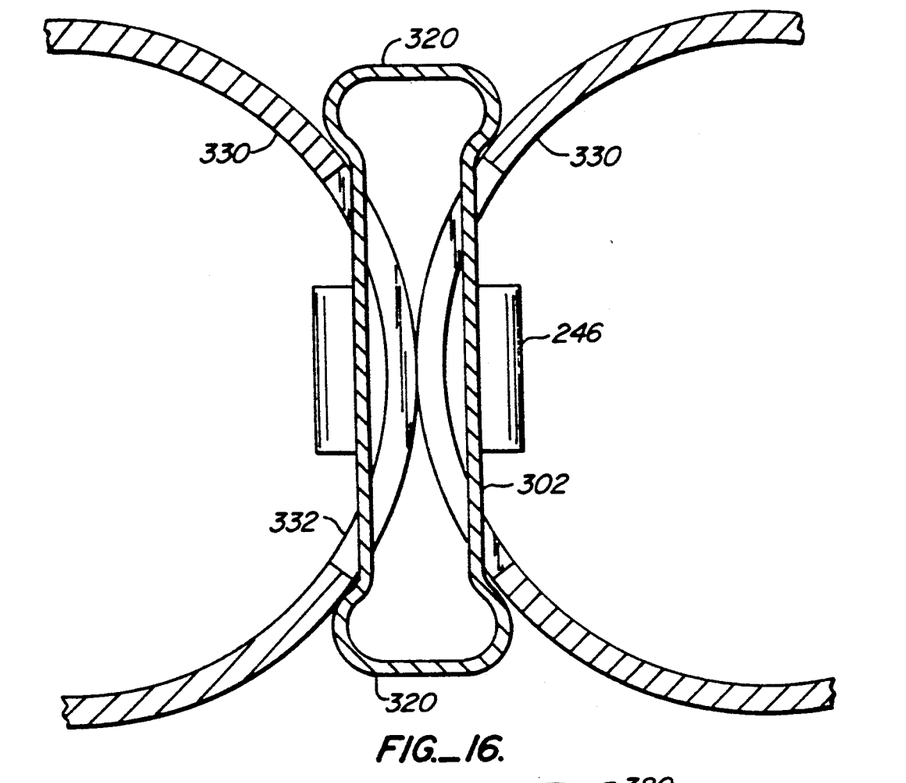
FIG. 16 is a top plan view of two ferrules with the spring of FIGS. 15A–15C captured therebetween; and, FIG. 17 is a perspective view of the spring and ferrules of FIG. 16.
Figure 17:
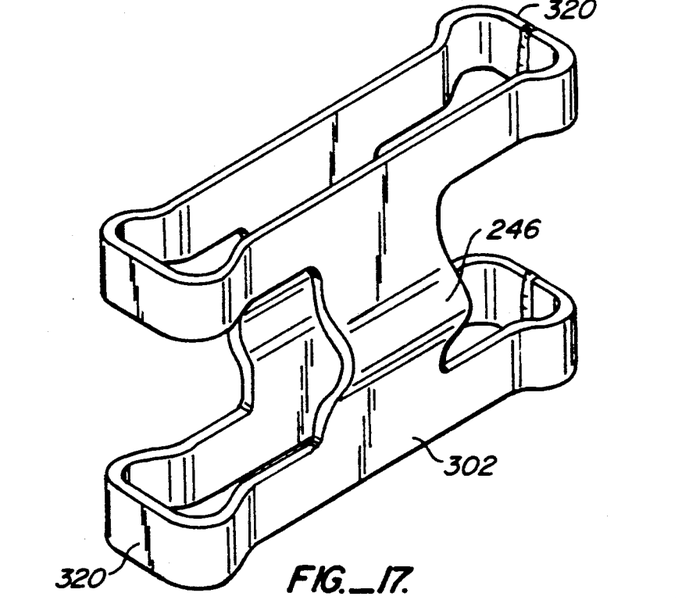

Referring to FIGS. 16 and 17, the trapping of the spring between two confronted ferrules can be understood. Two identical ferrules 330 are confronted at common rectilinear apertures 332. As before, these apertures when confronted define a common aperture between the ferrules and define at the sides of the spring trapping volume loop receiving apertures into which the (tab) loops protrude. Here the loop receiving slot receives the C-shaped loops 320. These respective C-shaped loops have a dimension that cause the retention and centering of the spring with respect to the ferrules. Were it not for this retention, the rod contacting portions of the spring 246 would cause retention—but at the same time permit undesirable excursion of the spring between the ferrules.

It will be appreciated that this disclosure will admit of modification. Any combination of a spring trapping aperture between a ferrule pair, a trapped spring, and tabs captured within tab receiving slots defined by the ferrule pair is intended to be broadly covered in this disclosure.

What is claimed is:

1. A spacer for use in combination with a fuel bundle, said fuel bundle having a plurality of fuel rods, a lower tie plate for supporting said plurality of fuel rods in side-by-side upstanding relation and defining a plurality of apertures for permitting water to be heated to enter said fuel bundle, an upper tie plate for maintaining the upper ends of said fuel rods in parallel side-by-side relation as supported on said lower tie plate and defining a plurality of apertures for permitting heated water and steam to escape from said fuel bundle, a channel for surrounding said fuel rods and extending from said lower tie plate to said upper tie plate for confining said water flow between said tie plates within said fuel bundle, and a plurality spacers for placement within said channel between said tie plates around said fuel rods for maintaining said fuel rods in designed side-by-side spacing, the improvement to said spacers comprising:

at least first and second side-by-side ferrules forming a ferrule pair for fitting around respective side-by-side fuel rods to maintain said fuel rods spaced apart one from another;

each said ferrule of said ferrule pair having at least one internal stop for permitting said fuel rod internal of said ferrule to be biased against said stop to a position of designed side-by-side alignment with respect to said fuel bundle at said spacer within said ferrule;

each said ferrule of said ferrule pair further defining an aperture for confrontation with a corresponding aperture of said ad]acent ferrule of said ferrule pair to define a common aperture between said ferrule pair for receiving a spring between said ferrules, said common aperture further defining tab receiving slots at the sides of said common aperture between said ferrules for confining said spring at protruding tabs to said aperture between said ferrule pair;

a loop spring having first and second legs, said first spring leg biasing a fuel rod interior of said first ferrule of said ferrule pair and a second spring leg for biasing a fuel rod interior of said second ferrule of said ferrule pair;

at least first and second tabs protruding from at least one of said spring legs, said first tab protruding from a first side of said spring and said second tab protruding from a second side of said spring, said tabs for maintaining said loop spring in said common aperture at said tab receiving slots; and, said first and second ferrules confronted at said apertures with said main body of said loop spring confined in said common aperture and said tabs protruding into said tab receiving slots to maintain said loop spring in said aperture whereby said respective spring legs of said loop spring can bias respective fuel rods in each said ferrule of said ferrule pair against said stops to maintain said fuel rods in designed side-by-side spacing.

2. The invention of claim 1 and wherein said common aperture has a rectangular shaped section.

3. The invention of claim 1 and wherein:

said loop spring includes said first and second tabs protruding from the top side of said loop spring; and, said loop spring includes at least third and forth tabs protruding from the bottom side of said spring at at least one of said spring legs, said third tab protruding from a first side of said spring and said forth tab protruding from a second side of said spring, said tabs for maintaining said loop spring in said common aperture at said tab receiving slots;

said first and second tabs engaging the top side of said tab receiving slots and said third and forth tabs engaging the bottom of said tab receiving slots.

4. The invention of claim 2 and wherein:

said tabs form an integral portion of said loop of said loop spring.

5. The invention of claim 1 and wherein said common aperture between said ferrules has an "I" shaped section.

6. A fuel bundle comprising:

a plurality of fuel rods;

a lower tie plate for supporting said plurality of fuel rods in side-by-side upstanding relation and defining a plurality of apertures for permitting water to be heated to enter said fuel bundle;

an upper tie plate for maintaining the upper ends of said fuel rods in parallel side-by-side relation as supported on said lower tie plate and defining a plurality of apertures for permitting heated water to escape from said fuel bundle, a channel for surrounding said fuel rods and extending from said lower tie plate to said upper tie plate for confining said water flow between said tie plates within said fuel bundle;

a plurality spacers for placement within said channel between said tie plates around said fuel rods for maintaining said fuel rods in designed side-by-side spacing;

each said spacer including at least first and second side-by-side ferrules forming a ferrule pair for fitting around respective side-by-side fuel rods to maintain said fuel rods spaced apart one from another;

each said ferrule of said ferrule pair having at least one internal stop for permitting said fuel rod internal of said ferrule to be biased against said stop to a position of designed side-by-side alignment with respect to said fuel bundle at said spacer within said ferrule;

each said ferrule of said ferrule pair further defining an aperture for confrontation with a corresponding aperture of said adjacent ferrule of said ferrule pair to define a common aperture between said ferrule pair for receiving a spring between said ferrules, said common aperture further defining tab receiving slots at the sides of said common aperture between said ferrules for confining said spring at protruding tabs to said aperture between said ferrule pair;

a loop spring having first and second legs, said first spring leg biasing a fuel rod interior of said first ferrule of said ferrule pair and a second spring leg for biasing a fuel rod interior of said second ferrule of said ferrule pair;

at least first and second tabs protruding from at least one of said spring legs, said first tab protruding from a first side of said spring and said second tab protruding from a second side of said spring, said tabs for maintaining said loop spring in said common aperture at said tab receiving slots; and, said first and second ferrules confronted at said apertures with said main body of said loop spring confined in said common aperture and said tabs protruding into said tab receiving slots to maintain said loop spring in said aperture whereby said respective spring legs of said loop spring can bias respective fuel rods in each said ferrule of said ferrule pair against said stops to maintain said fuel rods in designed side-by-side spacing.

7. The invention of claim 6 and wherein said common aperture has a rectangular shaped section.

8. The invention of claim 6 and wherein:
said loop spring includes said first and second tabs protruding from the top side of said loop spring; and,
said loop spring includes at least third and forth tabs protruding from the bottom side of said spring at at least one of said spring legs, said third tab protruding from a first side of said spring and said fourth tab protruding from a second side of said spring, said tabs for maintaining said loop spring in said common aperture at said tab receiving slots;
said first and second tabs engaging the top side of said tab receiving slots and said third and forth tabs engaging the bottom of said tab receiving slots.

9. The invention of claim 8 and wherein:
said tabs form an integral portion of said loop of said loop spring.

10. The invention of claim 6 and wherein said common aperture between said ferrules has an "I" shaped section.

11. A fuel bundle spacer for placement within a fuel bundle channel between upper and lower tie plates around fuel rods for maintaining said fuel rods in designed side-by-side spacing, said spacer comprising:
a matrix of ferrules coextensive with the construction of said spacer for placement within the fuel bundle;
each said spacer matrix of ferrules including at least first and second side-by-side ferrule pairs forming a ferrule pair for fitting around respective side-by-side fuel rods to maintain said fuel rods spaced apart one from another;
each said ferrule of said ferrule pair having at least one internal stop for permitting said fuel rod internal of said ferrule to be biased against said stop to a position of designed side-by-side alignment with respect to said fuel bundle at said spacer within said ferrule;
each said ferrule of said ferrule pair further defining an aperture for confrontation with a corresponding aperture of said adjacent ferrule of said ferrule pair to define a common aperture between said ferrule pair for receiving a spring between said ferrules, said common aperture further defining tab receiving slots at the sides of said common aperture between said ferrules for confining said spring at protruding tabs to said aperture between said ferrule pair;
a loop spring having first and second legs, said first spring leg biasing a fuel rod interior of said first ferrule of said ferrule pair and a second spring leg for biasing a fuel rod interior of said second ferrule of said ferrule pair;
at least first and second tabs protruding from at least one of said spring legs, said first tab protruding from a first side of said spring and said second tab protruding from a second side of said spring, said tabs for maintaining said loop spring in said common aperture at said tab receiving slots; and,
said first and second ferrules confronted at said apertures with said main body of said loop spring confined in said common aperture and said tabs protruding into said tab receiving slots to maintain said loop spring in said aperture whereby said respective spring legs of said loop spring can bias respective fuel rods in each said ferrule of said ferrule pair against said stops to maintain said fuel rods in designed side-by-side spacing.

12. The invention of claim 11 wherein said common aperture has a rectangular shaped section.

13. The invention of claim 9 and wherein:
said loop spring includes said first and second tabs protruding from the top side of said loop spring; and,
said loop spring includes at least third and forth tabs protruding from the bottom side of said spring at at least one of said spring legs, said third tab protruding from a first side of said spring and said forth tab protruding from a second side of said spring, said tabs for maintaining said loop spring in said common aperture at said tab receiving slots;

said first and second tabs engaging the top side of said tab receiving slots and said third and forth tabs engaging the bottom of said tab receiving slots.

14. The invention of claim 13 and wherein:
said tabs form an integral portion of said loop of said loop spring.

15. The invention of claim 9 and wherein said common aperture between said ferrules has an "I" shaped section.

16. A spacer for use in combination with a fuel bundle, said fuel bundle having a plurality of fuel rods, a lower tie plate for supporting said plurality of fuel rods in side-by-side upstanding relation and defining a plurality of apertures for permitting water to be heated to enter said fuel bundle, an upper tie plate for maintaining the upper ends of said fuel rods in parallel side-by-side relation as supported on said lower tie plate and defining a plurality of apertures for permitting heated water and steam to escape from said fuel bundle, a channel for surrounding said fuel rods and extending from said lower tie plate to said upper tie plate for confining said water flow between said tie plates within said fuel bundle, and a plurality spacers for placement within said channel between said tie plates around said fuel rods for maintaining said fuel rods in designed side-by-side spacing, the improvement to said spacers comprising:
- at least first and second side-by-side ferrules forming a ferrule pair for fitting around respective side-by-side fuel rods to maintain said fuel rods spaced apart one from another;
- each said ferrule of said ferrule pair having at least one internal stop for permitting said fuel rod internal of said ferrule to be biased against said stop to a position of designed side-by-side alignment with respect to said fuel bundle at said spacer within said ferrule;
- each said ferrule of said ferrule pair further defining an aperture for confrontation with a corresponding aperture of said adjacent ferrule of said ferrule pair to define a common aperture between said ferrule pair for receiving a spring between said ferrules, said common aperture further defining receiving slots at the sides of said common aperture between said ferrules for confining said spring at protruding loops to said aperture between said ferrule pair;
- a loop spring having first and second vertical legs, said first spring leg biasing a fuel rod interior of said first ferrule of said ferrule pair and a second spring leg for biasing a fuel rod interior of said second ferrule of said ferrule pair;
- a first horizontal loop integral with and connecting the upper ends of the vertical spring legs, and a second horizontal loop integral with and connecting the lower ends of the vertical spring legs, said loops for maintaining said loop spring in said common aperture at said loop receiving slots; and,
- said first and second ferrules confronted at said apertures with said main body of said loop spring confined in said common aperture and said loops protruding into said loop receiving slots to maintain said loop spring in said aperture whereby said respective spring legs of said loop spring can bias respective fuel rods in each said ferrule of said ferrule pair against said stops to maintain said fuel rods in designed side-by-side spacing.

17. The invention of claim 16 and wherein said loops have respective C-shaped ends and said loops protrudes outwardly of said loop receiving slots at a dimension that exceeds the dimension of said slots whereby said C-shaped ends center said spring in said common aperture.

18. The invention of claim 16 and wherein each said aperture of said ferrule pair is rectilinear.

19. The invention of claim 16 and wherein each said aperture of said ferrule pair is I-shaped.

* * * * *